No. 725,691. PATENTED APR. 21, 1903.
L. S. FLETCHER.
BICYCLE HANDLE.
APPLICATION FILED JUNE 7, 1902.
NO MODEL.
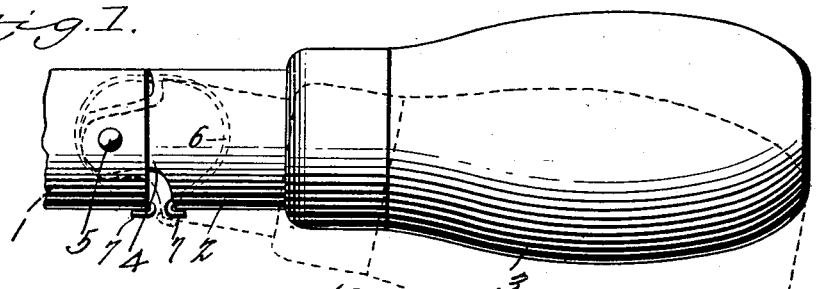
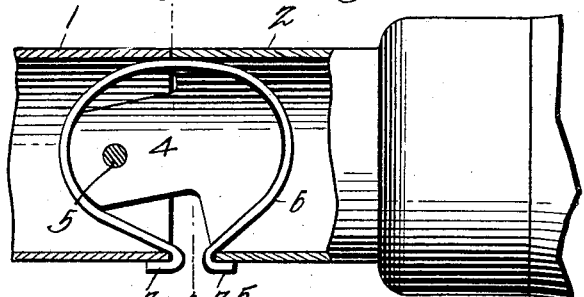
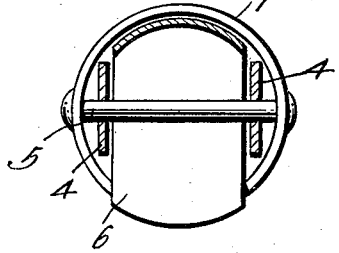
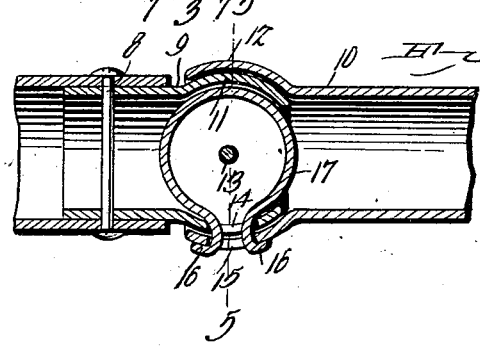
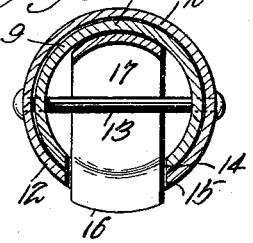
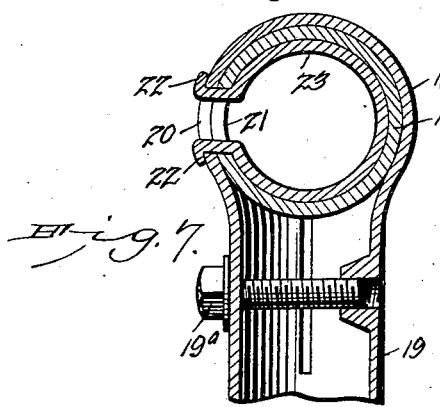
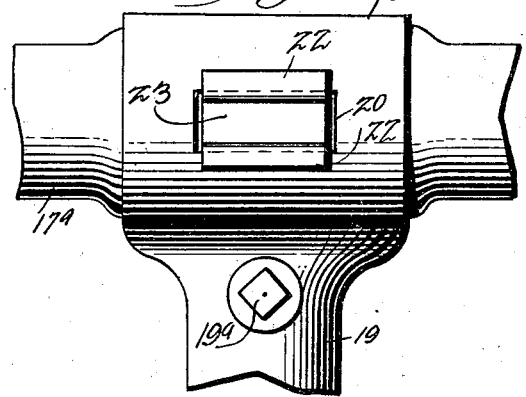
Witnesses
L. S. Fletcher, Inventor.
by
Attorneys

UNITED STATES PATENT OFFICE.

LOUIS STANTON FLETCHER, OF ANAHEIM, CALIFORNIA.

BICYCLE-HANDLE.

SPECIFICATION forming part of Letters Patent No. 725,691, dated April 21, 1903.

Application filed June 7, 1902. Serial No. 110,656. (No model.)

*To all whom it may concern:*

Be it known that I, LOUIS STANTON FLETCHER, a citizen of the United States, residing at Anaheim, in the county of Orange and State of California, have invented a new and useful Bicycle-Handle, of which the following is a specification.

The invention is an improvement in bicycle-handles.

The object of the present invention is to improve the construction of bicycle-handles and to provide simple, inexpensive, and efficient means for cushioning the grips of a handle-bar to relieve the rider of the vibration and jars of the handles incident to the passage of a bicycle over rough roads when the handle-bars and the grips thereof are rigid with the post or steering-head.

A further object of the invention is to provide a device of this character which will permit the handles or grips of a bicycle to have a limited upward-and-downward movement and in which the handles or grips will be effectively cushioned in such movement.

The invention consists in the construction and novel combination and arrangement of parts hereinafter fully described, illustrated in the accompanying drawings, and pointed out in the claims hereto appended.

In the drawings, Figure 1 is a side elevation of a portion of a handle-bar having a cushioned joint constructed in accordance with this invention. Fig. 2 is a longitudinal sectional view of the same. Fig. 3 is a transverse sectional view on the line 3 3 of Fig. 2. Fig. 4 is a longitudinal sectional view illustrating the manner of applying the cushioned joint to bicycles having rigid handle-bars and handles. Fig. 5 is a transverse sectional view of the same on the line 5 5 of Fig. 4. Fig. 6 is an elevation of a portion of a handle-bar and the post which supports the same, illustrating a modification of the invention. Fig. 7 is a vertical sectional view of the same.

Like numerals of reference designate corresponding parts in all the figures of the drawings.

1 and 2 designate sections of a handle-bar of a bicycle, the section 2 being connected with the handle or grip 3 at its outer end and being provided at its inner end with ears 4, arranged at opposite sides of and extending into the section 1, as clearly shown in Fig. 2 of the drawings. The ears 4 are perforated for the reception of a transverse pivot or pintle 5, which also passes through the sides of the section 1. The lower portion of the section 2 is cut away to provide a space at the bottom when the upper edges abut, as shown in Fig. 2, to permit the section 2 to move upward and downward. The section to which the handle is connected is cushioned by means of an approximately circular spring 6, arranged within the sections and extending from the top to the bottom thereof and having its terminals bent outward and forming hooks 7 for engaging the lower edges of the sections. When the handle or grip is forced downward, the spring is compressed and will cushion the handle. The pivot 5, which connects the sections, is arranged within the spring.

In order to enable the device to be applied to bicycles having rigid handle-bars and handles, the construction shown in Figs. 4 and 5 is employed. This construction comprises two sections or members pivoted together and forming a coupling. The handle of the bicycle is cut and the coupling is secured by rivets 8 or other suitable fastening devices to the sections of the handle-bar. The sections or members 9 and 10 of the coupling are provided at their inner adjacent ends with enlarged rounded portions 11 and 12, connected by a pivot 13 and forming a partial ball-and-socket connection. The rounded portion 11 is arranged within the rounded portion 12, as clearly shown in Figs. 4 and 5, and the inner and outer portions 11 and 12 are provided at the bottom with openings 14 and 15 and are engaged by terminal hooks 16 of an approximately circular spring 17. The circular spring 17 is arranged within the joint, and it is compressed when the outer section 10 is moved downward with relation to the inner section 9, and it is adapted to cushion the handle or grip similar to the spring 6, heretofore described.

In Figs. 6 and 7 of the drawings is illustrated another form of the invention in which a continuous handle-bar 17ª is employed, and this handle-bar is capable of a limited pivotal or rotary movement within a cylindrical portion or sleeve 18 of a post 19. The post 19 is designed to be secured in the steering-head of a bicycle in the ordinary manner, and it is provided adjacent to the cylindrical portion or sleeve with a clamping-screw 19ª to secure the necessary frictional engagement or contact of the parts. The sleeve and the handle-bar are provided with openings or slots 20 and 21 and are engaged by the terminals 22 of a circular spring 23, which is arranged within the joint, as clearly shown in Fig. 7. The terminals of the spring are hook-shaped and engage the edges of the sleeve and the handle-bar, whereby the spring is adapted to hold the handles yieldingly in an intermediate position or at an intermediate point of rest to permit the handles to move either upward or downward from such position in cushioning the handles to relieve the same from vibration and jar. The handle-bar is capable of a limited pivotal or rotary movement within the sleeve or cylindrical portion of the post to effect this result. The spring 17 (shown in Figs. 4 and 5 of the drawings) also holds the outer section or member yieldingly at an intermediate point, and the said outer section or member 10 is adapted to move upward and downward from such position in cushioning the handle or grip. The handle-bar and the sleeve or cylindrical portion of the steering head or post may be constructed in any desired manner to permit the assembling of the parts.

It will be seen that the cushioning device is exceedingly simple and inexpensive in construction, that it possesses great strength and durability, and that it is adapted to be readily applied to bicyles either during the course of construction or after the same have been manufactured.

What I claim is—

1. In a device for cushioning bicycle-handles the combination of two sections or members having a limited pivotal movement arranged to permit an up-and-down movement of the handles, and an approximately circular spring arranged within the sections or members and having its terminals located adjacent to each other and provided with reversely-arranged hooks engaging the sections or members, substantially as described.

2. In a device of the class described the combination of two sections or members connected together and having a limited pivotal movement arranged to permit an up-and-down movement of the handles of a bicycle, and an approximately circular spring arranged within the sections or members and having its ends arranged adjacent to each other and provided with reversely-arranged terminal hooks engaging opposite edges of the sections at the exterior of the same, substantially as described.

3. In a device for cushioning bicycle-handles, the combination of two sections or members having a limited pivotal movement and a single spring having bearings in opposite directions on oppposite seats carried by each of said members.

4. In a device for cushioning bicycle-handles, relatively movable elements or members of the handle and a single spring having bearings in opposite directions on seats carried by each of said relatively movable elements.

5. In a device for cushioning bicycle-handles, relatively movable members of the handles pivoted directly to each other and a single spring located within said members and having its ends projecting through openings in said members and oppositely seated on the edges of said openings.

6. In a device of the class described, the combination of two sections or members provided with registering openings, one of the sections or members being capable of a limited movement, and a spring engaging the sections or members at the opposite edges of both of said openings and holding the movable section or member at an intermediate point of rest, substantially as described.

7. In a device of the class described, the combination of two sections or members provided with circular portions having registering openings, one of the circular portions being fitted within the other, and a spring housed within the sections or members and having its terminals engaging the same at opposite edges of the openings and yieldingly holding one of the sections at an intermediate point of rest, substantially as described.

In testimony that I claim the foregoing as my own I have hereto affixed my signature in the presence of two witnesses.

LOUIS STANTON FLETCHER.

Witnesses:
P. J. WEISEL,
N. F. STEADMAN.